(12) United States Patent
Tokhtuev (10) Patent No.: US 10,126,152 B1
(45) Date of Patent: Nov. 13, 2018

(54) FLUID FLOW METER WITH LINEARIZATION

(71) Applicant: Ecolab USA Inc., St. Paul, MN (US)

(72) Inventor: Eugene Tokhtuev, Duluth, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/658,435

(22) Filed: Jul. 25, 2017

(51) Int. Cl.
| | |
|---|---|
| *G01F 1/06* | (2006.01) |
| *G01F 1/66* | (2006.01) |
| *G01F 3/10* | (2006.01) |
| *G01F 25/00* | (2006.01) |

(52) U.S. Cl.
CPC ............... *G01F 1/06* (2013.01); *G01F 1/66* (2013.01); *G01F 3/10* (2013.01); *G01F 25/003* (2013.01)

(58) Field of Classification Search
CPC ............... G01F 1/08; G01F 15/00; G01F 3/04
See application file for complete search history.

(56) References Cited

U.S. PATENT DOCUMENTS

| | | | |
|---|---|---|---|
| 3,779,457 A | 12/1973 | Lynas et al. | |
| 3,910,112 A | 10/1975 | Gerlach et al. | |
| 4,240,294 A | 12/1980 | Grande | |
| 4,328,549 A | 5/1982 | Avery | |
| 4,829,808 A | 5/1989 | West | |
| 4,976,137 A | 12/1990 | Decker et al. | |
| 5,014,211 A | 5/1991 | Turner et al. | |
| 5,118,008 A | 6/1992 | Williams et al. | |
| 5,275,043 A * | 1/1994 | Cotton | G01F 3/10 418/191 |
| 5,315,862 A | 5/1994 | Hasselmann | |
| 5,746,238 A | 5/1998 | Brady et al. | |
| 5,771,178 A * | 6/1998 | Stemporzewski, Jr. | B67D 7/32 137/391 |
| 5,857,589 A | 1/1999 | Cline et al. | |
| 5,895,863 A | 4/1999 | Glaudel et al. | |
| 6,383,237 B1 | 5/2002 | Langer et al. | |
| 7,034,937 B2 | 4/2006 | Crudge et al. | |
| 7,177,780 B2 | 2/2007 | Hillam et al. | |

(Continued)

FOREIGN PATENT DOCUMENTS

| | | |
|---|---|---|
| CA | 2859228 A1 | 2/2016 |
| CN | 202188872 U | 4/2012 |

(Continued)

OTHER PUBLICATIONS

Eugene Tokhtuev, U.S. Appl. No. 15/658,437, entitled "Fluid Flow Meter With Normalized Output," filed Jul. 25, 2017, 34 pages.

(Continued)

*Primary Examiner* — Jewel V Dowtin
(74) *Attorney, Agent, or Firm* — Fredrickson & Byron, P.A.

(57) ABSTRACT

A fluid flow meter is described, that includes intermeshing gears that may rotate synchronously. The fluid flow meter may produce a pulsed output that can be normalized to suitable values according to a method of normalizing input pulses generated in response to the rotation of gears. A volume counter can be incremented by an amount equal to a volume per input pulse each time an input pulse is generated. When the volume counter exceeds a first reference volume, a normalized output pulse can be generated until the volume counter exceeds a second reference volume.

20 Claims, 8 Drawing Sheets

(56) References Cited

U.S. PATENT DOCUMENTS

| | | | |
|---|---|---|---|
| 7,523,660 B2* | 4/2009 | Albrecht | G01F 3/10 |
| | | | 73/261 |
| 8,069,719 B2 | 12/2011 | Tokhtuev et al. | |
| 8,166,828 B2 | 5/2012 | Skirda et al. | |
| 8,590,362 B2 | 11/2013 | Carbone, II et al. | |
| 8,742,883 B2* | 6/2014 | Pelkey | G05B 23/0224 |
| | | | 340/3.1 |
| 8,943,901 B2 | 2/2015 | Tokhtuev et al. | |
| 9,051,163 B2 | 6/2015 | Mehus et al. | |
| 9,383,235 B2* | 7/2016 | Tokhtuev | G01F 1/06 |
| 2008/0295568 A1 | 12/2008 | Nanaji et al. | |
| 2009/0314115 A1 | 12/2009 | Breeser | |
| 2011/0031272 A1 | 2/2011 | Comiskey et al. | |
| 2011/0308888 A1 | 12/2011 | Carothers et al. | |
| 2012/0047988 A1 | 3/2012 | Mehus et al. | |
| 2013/0092704 A1 | 4/2013 | Tincher et al. | |
| 2013/0192678 A1 | 8/2013 | Hammonds | |
| 2014/0034668 A1 | 2/2014 | Carbone, II et al. | |
| 2014/0318639 A1 | 10/2014 | Peret et al. | |
| 2016/0258790 A1* | 9/2016 | Tokhtuev | G01F 1/065 |

FOREIGN PATENT DOCUMENTS

| | | | |
|---|---|---|---|
| CN | 202734883 U | 2/2013 | |
| DE | 102008008427 B3 | 11/2009 | |
| EP | 2793977 B1 | 11/2015 | |
| GB | 1384789 A | 2/1975 | |
| GB | 2120792 A | 12/1983 | |
| GB | 2177802 A | 1/1987 | |
| WO | 2012126473 A2 | 9/2012 | |
| WO | 2014144557 A2 | 9/2014 | |

OTHER PUBLICATIONS

Hejin Liu et al., Machine translation of the Description, Technical Field, Summary, Brief Description and Detailed Description of Chinese Patent Application No. 202188872, filed Apr. 11, 2012, 4 pages.

Josiah Firth et al., "A novel optical telemetry system applied to flowmeter networks," Flow Measurement and Instrumentation 48 (2016) pp. 15-19, Sydney, Australia.

Suzanne Shelley, "Choosing the Best Flowmeter: Here are the pros and cons of six popular flowmeter technologies," Chemical Engineering: New York, 106.7 (Jul. 1999), 13 pages.

\* cited by examiner

| Current state | Next valid state |
|---|---|
| A | B |
| B | C |
| C | D |
| D | E |
| E | F |
| F | G |
| G | H |
| H | A |

FLUID FLOW METER WITH LINEARIZATION

BACKGROUND

Positive displacement fluid measurement systems may be used to measure a flow rate or volume of a fluid or gas. For example, dispensing systems may use feedback from a positive displacement fluid meter to control the volume of fluid dispensed. Such control systems are often used in lieu of time-on controls to more accurately dispense precise amounts of fluid or gas and is commonly used in a variety of settings including, but not limited to, the industrial, healthcare, pharmaceutical and food and beverage industries. For example, a positive displacement fluid meter may be used in the manufacturing process of a drug which requires accurate measurement of two materials to be mixed into a single batch. The positive displacement fluid meter may be installed in the supply lines of the respective materials and feedback from the meters may be used to dispense the appropriate amount of each material into a blend tank to be mixed. This application of a positive displacement meter, like many others, may require the positive displacement meter to have an accuracy of measurement (e.g., +/−0.5%) to comply with quality control or regulations, for example. Accordingly, a positive displacement meter that accurately measures a volume of fluid or gas can help facilitate performing intended function of a fluid dispensing system or process.

An example fluid flow meter is described in the commonly-assigned application, U.S. Pat. No. 9,383,235, assigned to Ecolab Inc., St. Paul, Minn., the disclosure of which is hereby incorporated by reference. Manufacturers typically provide a factory calibration which correlates the volume of a pocket of fluid to a rotational count corresponding to rotation of one or more components (e.g., oval gears) in the flow meter for various volumes of flows. Thus, by counting the number of pulses produced by the fluid flow meter, the volume flow rate can be determined based on the factory calibration.

Such factory calibration may not be accurate outside of a flow range. For instance, at low flow rates near the flow minimum, the flow meter may not produce any input pulses, but may still have flow through various mechanical components of the flow meter. Similar issues may occur at operation near the flow maximum. Accordingly, manufacturers specify a range over which the flow meter's calibration is reliable. However, doing so may be restrictive to an end user who may intend to use flow meters for measuring flow over a wide range.

SUMMARY

In one aspect, this disclosure includes a fluid flow meter comprising a first gear intermeshing with a second gear and thereby having synchronous rotation in response to flow of a fluid therethrough. The fluid flow meter having a nominal operating range between a maximum volumetric flow rate and a minimum volumetric flow rate. The meter can have a flow sensor to generate a detection signal in response to the passage of fluid through the flow chamber and/or synchronous rotation of the first gear and the second gear. The meter can also have a controller operatively coupled to a data storage medium. The controller can receive detection signal from the flow sensor to generate input pulses and determine a pulse frequency of input pulses, whereby, the pulse frequency corresponds to a number of pulses per second. The controller can further determine a deviation of the pulse frequency of input pulses from a predetermined pulse frequency. The controller can generate a correction function based on the deviation. The controller can determine whether the fluid flow meter is operating outside the nominal operating range based on the deviation and/or the correction function and apply the correction function to input pulses when the controller determines that the fluid flow meter is operated outside the nominal operating range.

In another aspect, the controller can retrieve the generic calibration of the fluid flow meter. The controller may further determine a predetermined time interval between input pulses based on the generic calibration. In addition, the controller can receive detection signal from the flow sensor to generate actual input pulses. The controller can determine an actual time interval between input pulses during use and determine a deviation between the predetermined time interval and actual time interval between input pulses. The controller may correct the input pulses by an amount corresponding to the deviation to generate an output pulse.

In another aspect, the controller may be coupled to an output pulse generator. The controller can generate a correction function based on a predetermined time interval between input pulses and the actual time interval between input pulses. The controller can increment a volume counter by an amount equal to a volume per input pulse at a time corresponding to time interval of input pulse corrected by the correction function. The controller can transition the output pulse generator from a state where the output pulse generator does not generate output pulses to a state where the output pulse generator starts generating an output pulse when the volume counter exceeds a first reference volume. The controller can transition the output pulse generator from a state where the output pulse generator generates the output pulse back to a state where the output pulse generator stops generating the output pulse.

The details of one or more examples are set forth in the accompanying drawings and the description below. Other features, objects, and advantages will be apparent from the description and drawings, and from the claims.

DETAILED DESCRIPTION

Figure 1:
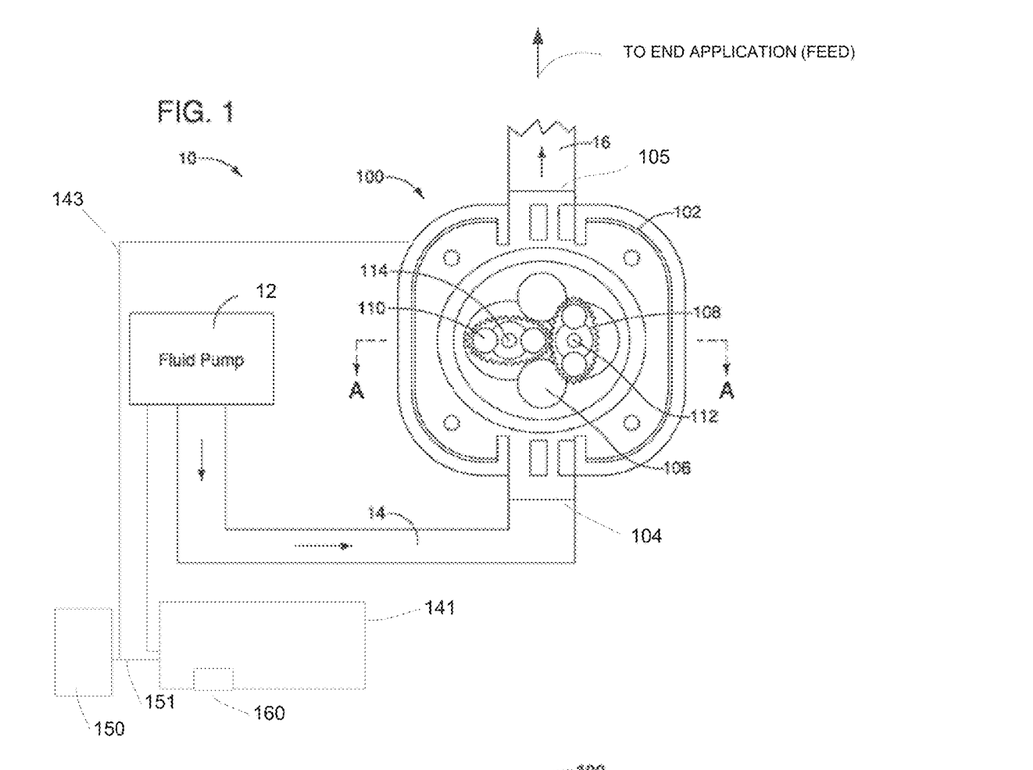
FIG. 1 is a schematic of a fluid flow meter according to an embodiment.

FIG. 1 is a top plan view of a fluid flow measurement system 10 including a fluid flow meter 100. System 10 includes a fluid pump 12, a first fluid line 14, a second fluid line 16 and a fluid flow meter 100. First fluid line 14 may be in fluid communication with fluid pump 12 configured to provide a fluid flow through system 10. Fluid pump 12 may be in fluid communication with a fluid source (not shown) and may be any suitable pump to provide a fluid flow through the system. The fluid flow may have a variety of fluid flow characteristics and may depend on the type of pump selected or the application of system 10. For example, different applications may require either a high fluid volume or a low fluid volume. Certain examples may require uniform fluid flow provided by a peristaltic pump or pressure-maintained fluid lines. In other examples, a fluid pump 12 may provide non-uniform fluid flow particularly where the application requires a low fluid volume.

Fluid flow meter 100 may be configured to measure fluid flow through system 10 and may include a housing 102 defining a chamber 106, a fluid inlet 104 and a fluid outlet 105. In the illustrated embodiment, fluid flow meter 100 is a positive displacement meter, such as an oval gear 108 flow meter. Fluid inlet 104 may be in fluid communication with first fluid line 14 and provides fluid flow from the first fluid line 14 into chamber 106. Oval gears 108 and 110 are installed within chamber 106 and are configured to rotate in concert about fixed axes of rotation 112 and 114, respectively, in response to fluid flow through the chamber 106. Fluid exits chamber 106 by way of fluid outlet 105 which is in fluid communication with second fluid line 16.

Accordingly, fluid provided by fluid pump 12 flows through fluid line 14 and into fluid flow meter 100 through fluid inlet 104. The fluid then flows through fluid flow meter 100, wherein the volume is measured, and out of the fluid flow meter 100 through fluid outlet 105 and into second fluid line 16.

Figure 2:
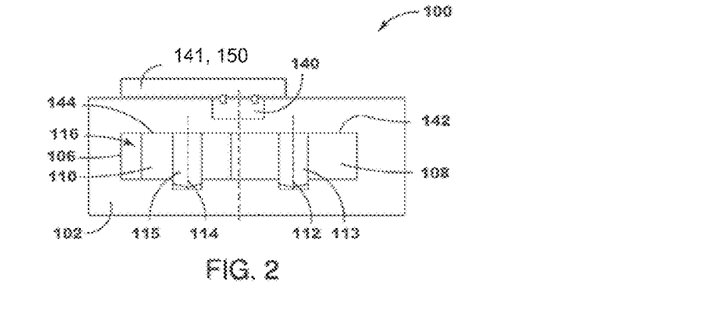
FIG. 2 is a cross-sectional side view of the fluid flow meter taken along the sectional plane A-A illustrated in FIG. 1.

FIG. 2 is a cross-sectional side view of the fluid flow meter 100 taken along line A-A shown in FIG. 1. Oval gears 108 and 110 installed within the chamber 106 defined by housing 102 and may be configured to rotate about axes 113 and 115, respectively. In the illustrated embodiments, fluid flow meter 100 may include flow sensor 140 and controller 141. The flow sensor 140 may be in communication (e.g., electrically by way of connection 143, or wirelessly) with the controller 141. Flow sensor 140 may be configured to sense a detectable area 146 (not shown) provided on top surfaces 142 and 144 of oval gears 108 and 110, respectively. For example, flow sensor 140 may be a magnetic sensor configured to sense a detectable area 146 comprising a magnet installed on or within at least one of the oval gears 108. In another example, flow sensor 140 may be an optical sensor configured to emit a wavelength onto at least one top surface 142 or 244 of the oval gears 108 including a detectable area 146 and sense a reflectance of the wavelength off at least one of the top surfaces 142. U.S. Pat. No. 7,523,660, filed Dec. 19, 2007, and U.S. Pat. No. 8,069,719, filed Feb. 11, 2009, provide examples of oval gears 108 incorporating non-contact sensors, the entire disclosure of each of which is hereby incorporated herein by reference. It can be appreciated that fluid flow meter 100 may include any number of non-contact sensors and any number of detectable areas suitable for a particular application of the meter. Flow sensor 140 may also be configured to generate a detection signal based on the detection, or lack of detection, of a detectable area 146.

Fluid flow meter 100 may also include controller 141 configured to calculate a volume of fluid flow through the meter based on the detection signal of flow sensor 140. The controller 141 may be configured to receive a detection signal of flow sensor 140 and generate input pulses to correspond to the rotation of the oval gears 108 based on the detection signal. The controller 141 can be a programmable computer such as a microprocessor, a programmable logic controller 141, and the like, and can include (and/or be in communication with) non-transitory storage media (e.g., memory or a non-transitory storage medium 150) for storing instructions in the form of algorithms and/or data (e.g., calibration data). While an electrical connection 151 between the controller 141 and a non-transitory storage medium 150 is illustrated, it should be understood that the wireless connections between the controller 141 and the non-transitory storage medium 150 are contemplated. Further, it should be understood that while the electrical connections of the controller 141, non-transitory storage medium 150 and the fluid flow meter 100 are illustrated as being outside the housing 102 of the fluid flow meter 100 in FIG. 1, in FIG. 2, the controller 141 and the non-transitory storage medium 150 (along with associated connections) are housed within the housing 102 of the fluid flow meter 100 (as shown in FIG. 2). As will be discussed further herein, a volume of fluid passing through the fluid flow meter 100 may be calculated when the number of rotations (complete and partially complete) made by the oval gears 108 is known and a volume of fluid per rotation is known. Accordingly, controller 141 may be able to measure a volume of fluid passing through the meter based on the input pulses generated by the controller 141. In such cases, controller 141 may include a non-transitory storage medium 150 that stores a calibration between input pulses generated and volume of fluid passing through the fluid flow meter 100.

Figure 3A:
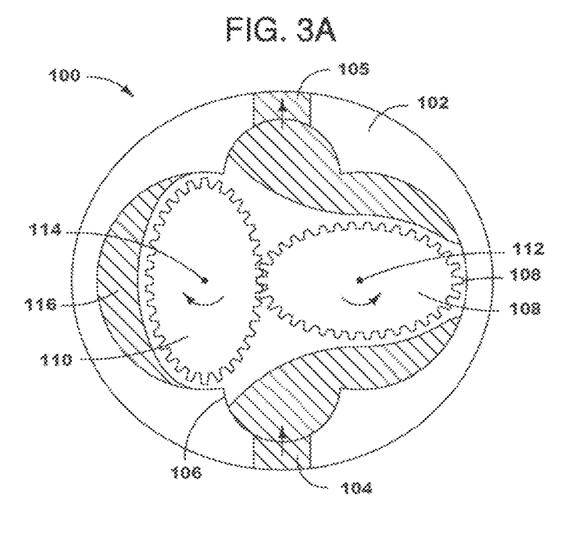
FIG. 3A is a sectional-plan view illustrating fluid flow through the fluid flow meter at a first rotational position of the oval gears.
Figure 3B:
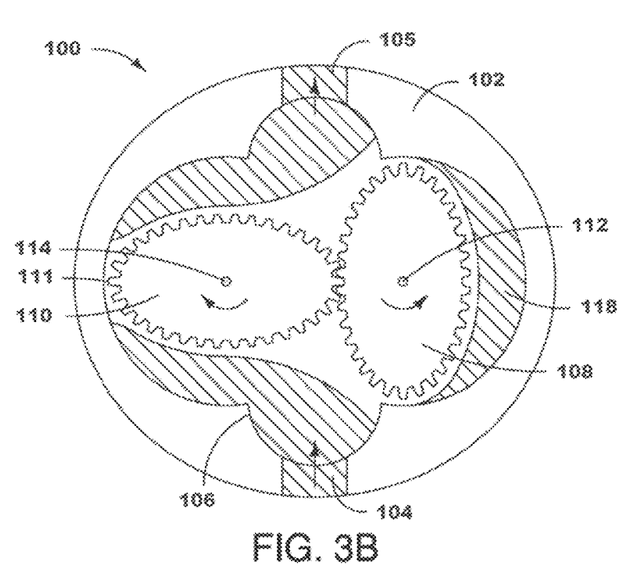
FIG. 3B is a sectional-plan view illustrating fluid flow through the fluid flow meter at a second rotational position of the oval gears.

FIGS. 3A and 3B are sectional-plan views illustrating fluid flow through the fluid flow meter 100. As seen therein, oval gears 108 and 110 are configured to intermesh thereby reducing the chances of fluid from fluid inlet 104 to pass between the gears. Accordingly fluid flows around the oval gears 108 by way of fluid pockets 116 and 118. FIG. 3A shows fluid flow meter 100 in a first rotational position where in fluid may be introduced into chamber 106 through fluid inlet 104. As noted above, the intermeshing of oval gears 108 and 110 reducing the chances of fluid from passing in between the gears thereby forcing the incoming fluid towards oval gear 108 and urging oval gear 108 to rotate in a counter-clockwise direction. The counter-clockwise torque applied across oval gear 108 in turn urges the clockwise rotation of oval gear 110.

FIG. 3B shows fluid flow meter 100 in a radially advanced rotational position relative to the rotational position shown in FIG. 3A, wherein oval gear 108 has rotated 90 degrees counter-clockwise and oval gear 110 has rotated 90 degrees clockwise. In this rotational position of fluid flow meter 100, the rotation of oval gear 108 has formed fluid pocket 118 defined by the surface of oval gear 108 and a wall of chamber 106. Concurrently, fluid from fluid inlet 104 is forced toward a vertex 111 of oval gear 110 thereby urging oval gear 110 to rotate in a clockwise direction. This in turn urges oval gear 108 to continue rotation in a counter-clockwise direction to release the fluid in fluid pocket 118. It can be appreciated that a similar fluid pocket 116 may be formed between oval gear 110 and a wall of chamber 106, as shown in FIG. 3A.

Fluid flow meters according to the present embodiments may be configured to increase the resolution of measurement thereby allowing a more precise measurement of fluid flow through the meter. These configurations may be useful in low fluid flow applications. In one example, the fluid flow meter 100 may be configured measure half rotations of the oval gears 108 which correspond to a volume equal to the volume of two fluid pockets 116. In another example, the fluid flow meter 100 may be configured to measure quarter rotations of the oval gears 108 which correspond to a volume equal to one fluid pocket 116. The resolution of measurement of fluid flow meter 100 may also depend on the volume of fluid pockets 116 of the meter. Generally, fluid pockets 116 with a smaller volume may increase the measurement resolution of an oval gear 108 as smaller volumes of fluid are dispensed per rotation of the oval gears 108. Conversely, larger fluid pockets 116 may decrease the resolution as larger volumes of fluid are dispensed per rotation. It can be appreciated that different applications may require a different measurement resolution and examples of the present application may be configured to have a wide range of resolutions.

Figure 4A:
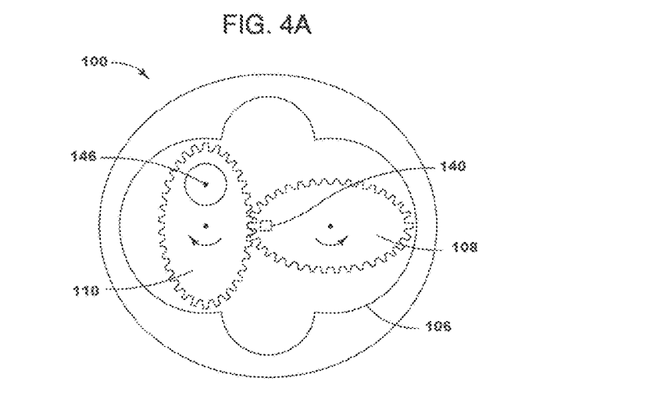
FIG. 4A is another sectional-plan view illustrating the fluid flow meter with non-contact sensors.

FIG. 4A is a sectional plan view of the fluid flow meter 100 including a flow sensor 140 and a detectable area 146. Flow sensor 140 may be configured to sense detectable area 146 provided on a surface of oval gear 110 and generate a detection signal. Flow sensor 140 may be mounted in a housing (102, not shown in FIG. 4A) of fluid flow meter 100 positioned above the top surfaces 142, 144 of oval gears 108 and 110. As indicated in FIG. 4A oval gear 108 and 110 are configured to rotate counter-clockwise and clockwise, respectively, in response to fluid flow through chamber 106. The rotation of oval gear 110 causes detectable area 146 to pass through a sensing region of flow sensor 140 that may be located underneath the sensor. Upon sensing detectable area 146, flow sensor 140 may generate a detection signal. Thus, a detection signal of flow sensor 140 may be indicative of a rotational position of oval gears 108 and 110 wherein detectable area 146 is underneath flow sensor 140. In this example, flow sensor 140 may be configured to generate a "positive" signal (e.g., "1" or "high") when the sensor senses the detectable area 146 and a "negative" signal (e.g., "0" or "low") when the sensor does not sense the detectable area 146. It can be appreciated that the detection signal generated by a flow sensor 140 may be of any form in any format suitable for indicating a sensing of a detectable area 146. In certain examples, a flow sensor 140 may be configured to not generate a detection signal when a detectable area 146 is not sensed. In such an example, the lack of a signal may still be indicative of a rotational position wherein the detectable area 146 is not within a sensing region of the sensor. As described previously, the fluid flow meter 100 may include a controller 141 configured to generate a pulsed output based on the detection signal provided by flow sensor 140. In this example, fluid flow meter 100 is configured such that rotation of oval gears 108 and 110 may cause flow sensor 140 to sense detectable area 146. Thus, the controller 141 may be configured to generate a pulse in response to the detectable area 146 being sensed by the flow sensor 140, as will be described further below.

Figure 4B:
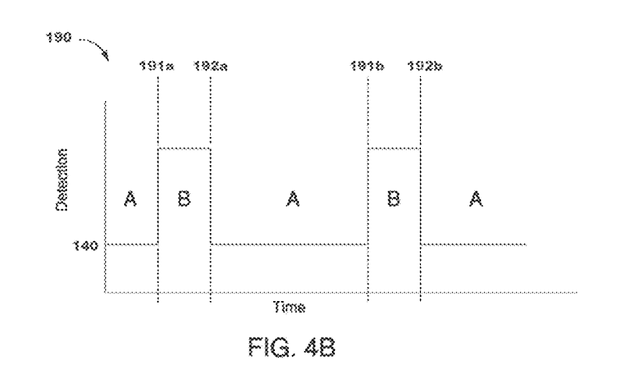
FIG. 4B is a schematic illustrating detection signals generated by the non-contact sensors shown in FIG. 4A.

FIG. 4B is a plot 190 of a detection signal of flow sensor 140 of fluid flow meter 100 over time according to an example. More specifically, plot 190 shows the detection signal of flow sensor 140 sensing detectable area 146 as oval gears 108 and 110 rotate in a forward direction in response to fluid flow through the meter. Plot 190 includes time points 191 $a$, 491 $b$, 492 $a$ and 492 $b$. Initially, the detection signal of flow sensor 140 is low indicating that oval gears 108 and 110 are in a rotational position wherein the detectable area 146 is not within a sensing region of the sensor. The detection signal is high between time points 191 $a$ and 192 $a$, and also 191 $b$ and 192 $b$, and is indicative of rotational positions of the oval gears 108 wherein the detectable area 146 is sensed by flow sensor 140. The detection signal becomes low again between time points 192 $a$ and 191 $b$, and also after time point 192 $b$, and is indicative of rotational positions of the oval gears 108 wherein the detectable area 146 is not sensed by the sensor. Additional or fewer rotational positions and/or detectable areas are contemplated within the scope of the present disclosure (and as will be described further below).

In this example, the rotational positions of the oval gears 108 in one full rotation of fluid flow meter 100 may be categorized into rotation states A and B. Rotation state A comprises all the rotational positions wherein detectable area 146 is not sensed by flow sensor 140 and is shown in plot 190 before time point 191 $a$, between time points 192 $a$ and 191 $b$, and also after time point 192 $b$. Rotation state B comprises all the rotational positions wherein the detectable area 146 is sensed by the flow sensor 140 and is shown in plot 190 between time points 191 $a$ and 192 $a$, as well as 191 $b$ and 192 $b$. When flow sensor 140 senses rotation state A and B, it generates a negative and positive detection signal, respectively. In such examples, the fluid flow meter 100 may include a controller 141 configured to calculate a volume of fluid flow through the meter by based on the detection signals provided by flow sensor 140. As oval gears 108 and 110 rotate in a forward direction in response to fluid flow through the meter, the gears eventually reach a rotational position wherein detectable area 146 is within a sensing region of the flow sensor 140. Accordingly, flow sensor 140 may sense rotation state B. It can be appreciated as the oval gears 108 continue to rotate in fluid flow meter 100, flow sensor 140 senses a sequence of rotation states comprising rotation state A and B, in order. As noted above, flow sensor 140 may be configured to generate a negative detection signal and a positive detection signal when rotation state A and B are sensed, respectively, and provide the signals to controller 141.

Concurrently, controller 141 of fluid flow meter 100 is configured to receive the detection signal from flow sensor 140 and produce a pulsed output. Upon receiving a detection signal indicative of both a rotation state and a rotational position of oval gears 108 and 110, the controller 141 determines whether the detection signal is positive. If the detection signal is positive then the controller 141 may generate one or more input pulses. If the detection signal is negative, then the controller 141 may not generate any input pulses. Referring back to FIG. 4B, it can be appreciated that input pulses can be generated by controller 141 at time points 191 $a$ and 191 $b$ when the detection signal goes from low to high. Alternatively, the controller 141 can be configured to generate input pulses when the detection signal goes from high to low (e.g., at time points 192 *a* and 192 *b*) by modifying step 187 to check to see if the detection signal is negative.

Embodiments described in FIGS. 1-4B can use algorithms that produce a pulsed output in response to the rotation of the oval gear 108 flow meter. For instance, in the embodiments described in FIGS. 1-4B, the controller 141 can be programmed with instructions that cause the controller 141 to generate a pulse. In such cases, the accuracy and resolution of the flow meter can be improved by generating input pulses that correspond to individual transition of the gears from a valid rotational state to another valid rotational state. FIG. 4C is a flow chart corresponding to one such algorithm 400.

Figure 4C:
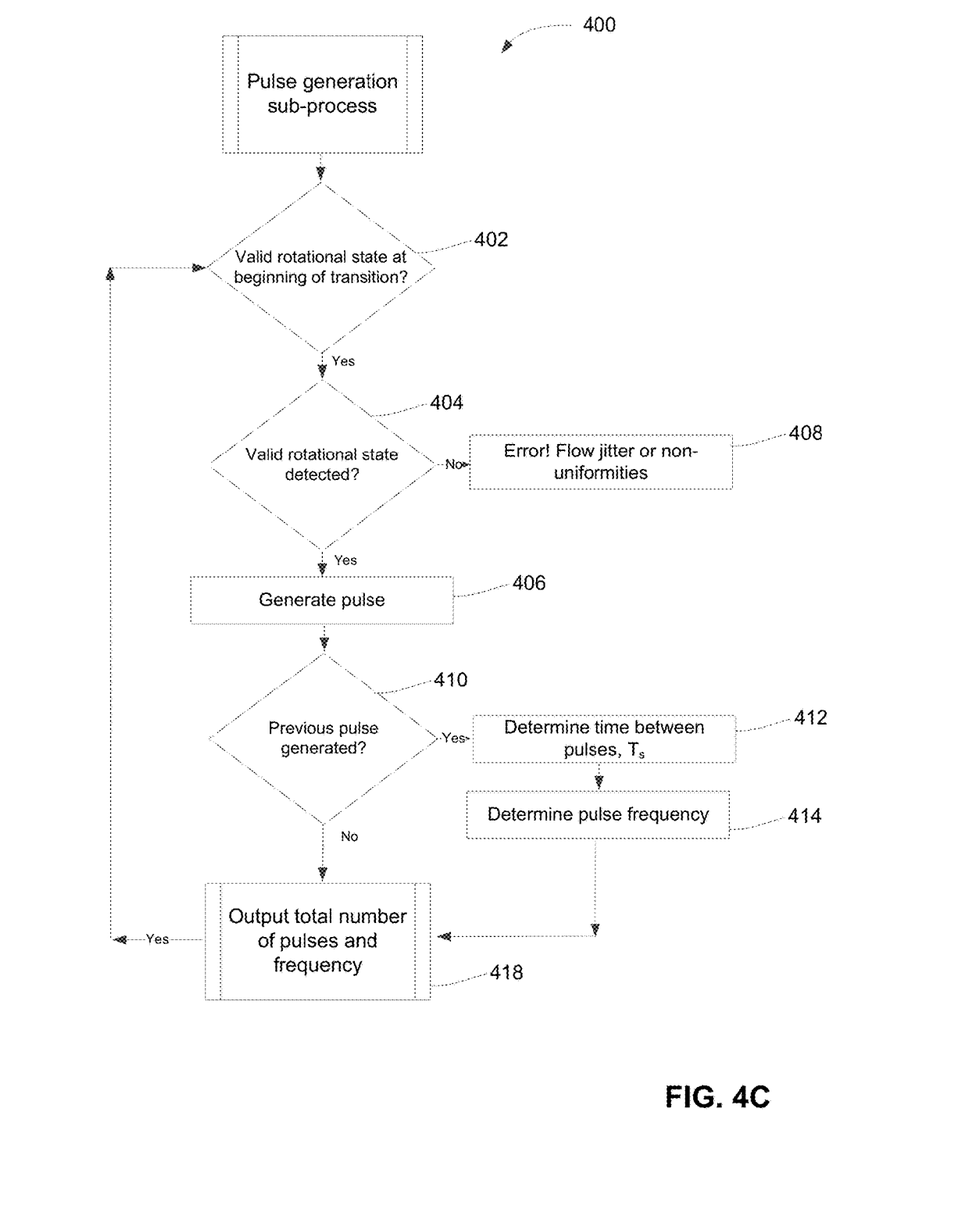
FIG. 4C is a schematic illustrating a pulse-generation method according to an embodiment.
Figure 4D:
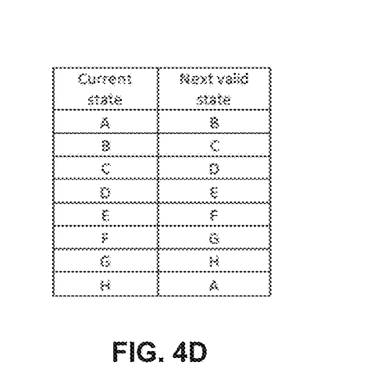
FIG. 4D is a schematic illustrating a sequence of valid rotational states of the oval gears of the fluid flow meter according to a non-limiting illustrative embodiment.

In the example illustrated in FIG. 4C, the oval gear 108 meter can have eight rotational states for every full rotation of the oval gears 108. For instance, the eight rotational states can be referred to as states A, B, C, D, E, F, G and H. FIG. 4D illustrates a chart that shows valid states in the sequence. In such cases, the controller 141 of the oval gear 108 meter can be programmed according to the algorithm of FIG. 4C, whereby the controller 141 is configured at step 402 to determine if the rotational state detected (e.g., by the flow sensor 140) is a valid rotational state. The controller 141 is then configured to determine (at step 404) if the oval gears 108 transition from a valid rotational state to another valid rotational state, according to the chart 4D. If for instance, the oval gears 108 transition from state A to state B, the controller 141 is configured to determine that the transition is valid, and generate a pulse at step 406. If on the other hand, the controller 141 determines that the transition is invalid (for instance, a state other than the states listed in right column of FIG. 4D for each corresponding state), then the controller 141 may not generate a pulse (corresponding to an error condition 408). Accordingly, in this example, the controller 141 will be configured to generate eight input pulses for a full rotation of the gears, corresponding to eight valid transitions between rotational states. While eight valid rotational states are illustrated, it should be noted that additional or fewer rotational states (corresponding to additional or fewer transitions and input pulses) respectively are contemplated within the scope of the present disclosure. Such embodiments facilitate accuracy of measurement and eliminate errors in measurement due to flow non-uniformities (such as jitter or backflow).

In certain embodiments, the controller 141 is configured to generate input pulses of duration shorter than time for transition from a valid rotational state to the next valid rotational state. In such cases, if the gears rotate "n" rotations per second, with "m" valid rotational states, the time taken by the oval gears 108 to transition from a valid rotational state to the next valid rotational state is given by:

$$T_{transition} = \frac{1}{m \times n}$$

In such cases, the controller 141 can be configured to set generate pulses having an input pulse duration ($T_{pulse}$) less than the transition time from a valid rotational state to the next valid rotational state:

$$T_{pulse} < T_{transition}$$

Such embodiments may facilitate in an accurate input pulse count by reducing any overlap that may occur between transition of gears into one or more rotation states and input pulse generation. In operation, each time the oval gears 108 transition from a valid rotational state to another valid rotational state, the controller 141 generates an input pulse having input pulse duration $T_{pulse}$. The time interval between adjacent pulses can be $T_s$. In such cases, an input pulse frequency $F_s$ can be defined, whereby the input pulse frequency is the inverse of the time interval of adjacent input pulses:

$$F_S = \frac{1}{T_S + T_{pulse}}$$

In the illustrated example, the fluid flow meter 100 has eight valid rotational states (as illustrated in FIG. 4D). If, for instance, the oval gears 108 have 100 rotation per second, the transition time from one rotational state to next about 1.25 milliseconds in accordance with the above-expression. Accordingly, the controller 141 may generate input pulses having a duration of between about 0.1 and about 0.5 ms. More generally, the input pulse duration ($T_{pulse}$) can be between about 5% and about 50% of the transition time ($T_{transition}$).

Referring again to FIG. 4C, the controller 141 may check, at step 410 if previous input pulses were generated. In such cases, the controller 141 may determine, at step 412, the time interval between adjacent input pulses, $T_s$ and frequency $F_s$ at step 414. At step 418, relevant data, such as input pulse count, time interval between input pulses and/or the frequency.

While the examples below relate to the illustrated fluid flow meter 100 of FIGS. 1-4B, it should be understood the examples described herein would apply to other types of positive displacement meters that produce a pulsed output. In some such example embodiments, the controller 141 can generate input pulses in response to the passage of the quantity of fluid through the flow chamber 106, and/or the displacement of rotating components of the fluid flow meter 100. For instance, the controller 141 can generate input pulses in response to the synchronous rotation of the first gear and the second gear as detected by the non-contact sensors. The controller 141 can also be configured to determine the input pulse frequency $F_s$ for a wide range of known operating conditions and volumetric flow rates to establish calibration data that can be stored in the non-transitory storage medium 150.

In certain embodiments, the fluid flow meter 100 can be calibrated by supplying a known quantity of fluid therethrough, and determining the volume per input pulse (also referred to as pulse rate, "P", e.g., in milliliters/pulse) for a known volumetric flow rate of fluid. Such methods can be referred to herein as "factory calibration." For instance, referring now to FIG. 5, an example calibration graph is illustrated that shows the relation between the volume per input pulse "P" and volumetric flow rate "V" for an example fluid flow meter 100. In this example, when volume of fluid passing through the fluid flow meter 100 may not be sufficient to cause gear rotation, input pulses may not be produced. At some non-zero value of volumetric flow rate, fluid begins to flow through the fluid flow meter 100, and input pulses are generated by the controller 141 at a non-zero input pulse frequency $F_s$.

In some such embodiments, flow meters typically have a flow range (e.g., between a maximum volumetric flow rate $V_{max}$ and minimum volumetric flow rate $V_{min}$) over which the relationship between volume flow per input pulse and flow (or flow rate) is linear. At low flow rates (e.g., less than $V_{min}$) the flow meter may not produce any input pulses as a result of the gears being non-rotational, but may still have fluid flowing through various mechanical components of the flow meter. Similar issues may occur at operation near the flow maximum where the flow meter may not produce any pulses as a result of slippage, even though a non-zero volume of fluid flows therethrough. As a result, volume per pulse "P" departs from its value in the range between maximum volumetric flow rate $V_{max}$ and minimum volumetric flow rate $V_{min}$. Accordingly, manufacturers typically specify a "nominal operational range" 500 of the fluid flow meter 100 over which calibration data of fluid flow meter 100 is believed to be reliable.

Figure 5:
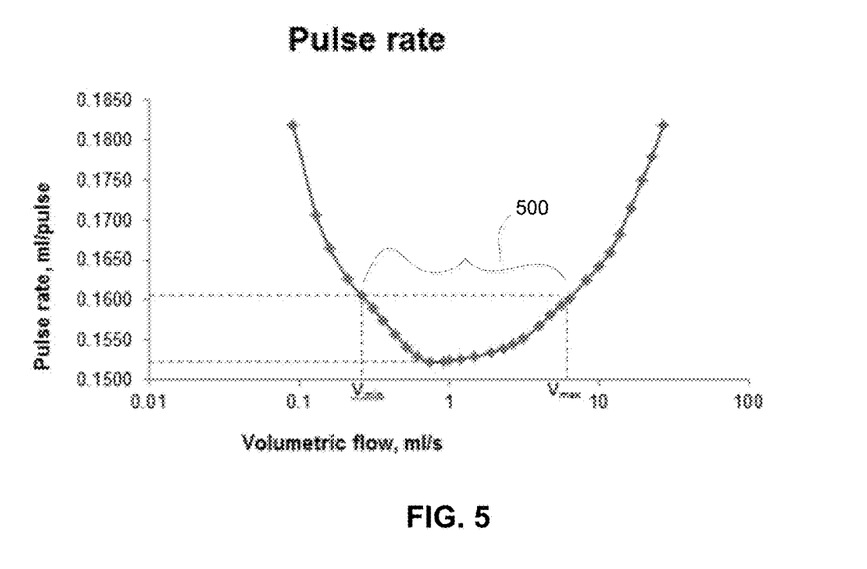
FIG. 5 is a non-limiting example of a generic calibration illustrating the relationship between volume per pulse and volumetric flow rate.

In certain illustrative examples, the above flow behavior may be generic to several flow meters and hence may be referred to as a 'generic calibration.' FIG. 5 represents one such example of a generic calibration. In FIG. 5, the calibration can be expressed as a volume that passes through the flow chamber 106 per input pulse of the flow meter ("P") plotted against volumetric flow rate ("V"). In some such cases, as illustrated, the volume per input pulse "P" (referred to as "pulse rate") may have an acceptable deviation. For example, the pulse rate can have a deviation of ±3% over the nominal operational range (between $V_{min}$ and $V_{max}$). The generic calibration can be stored in the data storage device (e.g., in the form of a look-up table). During use, each time an input pulse is generated, the controller 141 of the flow meter can retrieve the calibration data and provide an output in the form of volume or other related quantities (such as volumetric rate, in milliliters per second and the like). Outside of the nominal operational range, as seen in FIG. 5, the volume per input pulse "P" may have unacceptable values of deviation. With an increase in volume (e.g., when volume is greater than the volume at maximum volumetric flow rate $V_{max}$), the pulse rate can have large deviation relative to the pulse rate in the nominal operating range due to slippage. Further, the volume per input pulse may increase when the volume is less than minimum volumetric flow rate $V_{min}$ as a result of input pulses not being generated at low volumes. Such effects may be referred to as generic "non-linearities" and may lead to restricted use of flow meters.

The flow characteristics described above may be generic to several flow meters, and therefore may be a part of the "generic" calibration data. Accordingly, curve $C_1$ in FIG. 5 may be referred to as a "generic calibration curve." While the flow characteristics of each individual fluid flow meter 100 may depart from the generic calibration curve due to manufacturing tolerances, magnitude of generic non-linearities may be greater than any such variation between flow meters due to manufacturing tolerances. This may lead to flow meters being restricted to being operated within their nominal operational range which may inconvenience users.

Figure 6:
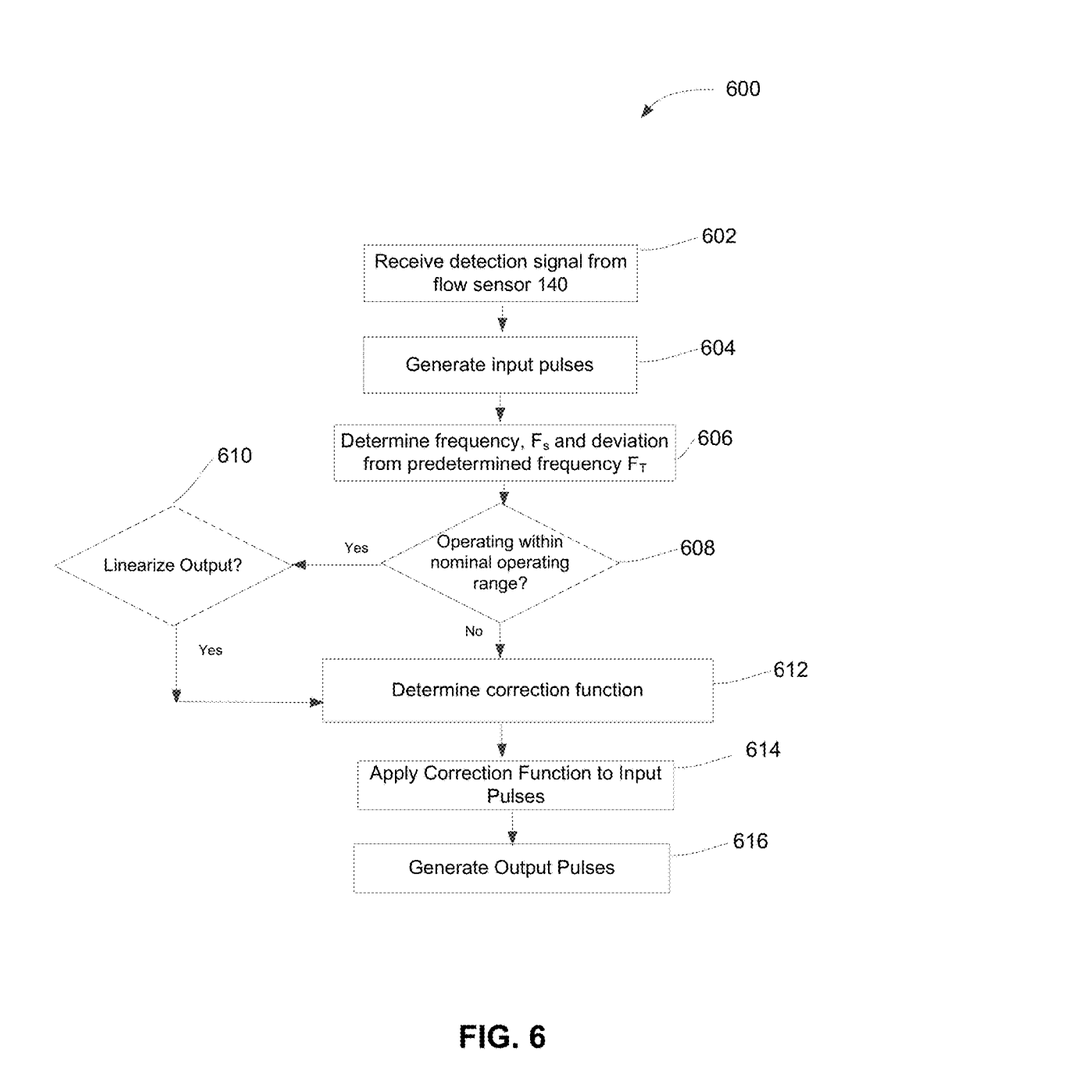
FIG. 6 is an exemplary algorithm to correct generic non-linearities according to a non-limiting illustrative embodiment.

Accordingly, in some such non-limiting exemplary embodiments, a fluid flow meter 100 is provided that can extend the range of operation by correcting output pulses to account for generic non-linearities. The correction may be performed by the controller 141 in accordance with methods disclosed herein. FIG. 6 represents one such illustrative algorithm 600 that would be executed by the controller 141. The algorithm can be stored, for instance, in a memory or a data storage medium and can be in the form of machine-readable and/or executable program or steps.

As seen from FIG. 6, at step 602, the controller 141 can receive detection signal from the flow sensor 140 to generate input pulses. At step 604, the controller 141 can determine a pulse frequency $F_s$ of input pulses, whereby, the pulse frequency corresponds to a number of pulses per second. At step 604, the controller 141 can also determine a deviation of the pulse frequency $F_s$ of input pulses from a predetermined pulse frequency $F_T$. The predetermined pulse frequency $F_T$ may either be retrieved from the memory or other data storage medium. Alternatively, the controller 141 may determine the predetermined pulse frequency $F_T$ based on the generic calibration, as will be described below. Advantageously, the controller 141 may, at step 608, determine whether the fluid flow meter 100 is operating outside the nominal operating range 500 based on the deviation of time interval between input pulses $T_s$ or input pulse frequency $F_s$ from a predetermined time interval $T_T$ or predetermined input pulse frequency $F_T$ respectively. Further, the controller 141 may determine whether it is necessary to linearize output at step 610. At step 612, the controller 141 may generate a correction function based on time interval between input pulses or the input pulse frequency. The controller 141 can, at step 614, apply the correction function to input pulses. At step 616, the controller 141 generates output pulses based on the correction function applied to input pulses. The output pulses may have desired pulse characteristics (e.g., pulse rate, input pulse frequency, duty cycle, and the like) and accounts for generic non-linearities.

In certain examples, the controller 141 may only apply the correction function when the controller 141 determines that the fluid flow meter 100 is operated outside the nominal operating range 500 (seen in FIG. 5). This may result in the controller 141 and in turn the flow meter being more optimized and/or using fewer computational resources, than if the controller 141 were to correct each individual pulse within the nominal operating range 500 and outside the nominal operating range 500. Alternatively, if a higher accuracy is desired, the controller 141 may correct each individual pulse within the nominal operating range 500 and outside the nominal operating range 500.

The method 600 may also include additional steps such as storing the determined correction function in the data storage medium. In such cases, the controller 141 may determine and correlate the correction function corresponding to different flow characteristics (e.g., pulse rate P, time between input pulses $T_s$ and/or volumetric flow rate V) and store them in the data storage medium in the form of a look-up table, so that subsequent uses of the flow meter may involve simply retrieving the corresponding value of the correction function when one or more flow characteristics are known. For instance, in an example, the controller 141 may generate output pulses corresponding to input pulses, whereby each output pulse is generated by retrieving the correction function corresponding to the input pulse frequency $F_s$, and applying the correction function to a corresponding input pulse.

As mentioned above, the output pulses may have desired pulse characteristics. In an example, the controller 141 is configured to generate a single output pulse corresponding to a plurality of input pulses (more than one input pulse per output pulse). Accordingly, a pulse frequency of the output pulse can be less than a pulse frequency of input pulses. In another example, the output pulses may be normalized as described in U.S. patent application Ser. No. 15/658,437, filed Jul. 25, 2017, titled "Fluid Flow Meter with Normalized Output," the entire contents of which is incorporated by reference. As described therein, the controller 141 may be in communication with an output pulse generator (160, best seen in FIG. 1) that can generate the output pulse such that the volume per output pulse is an integer.

In certain examples, the controller 141 can determine and control the duty cycle of output pulse. In an example, the controller 141 can increment a volume counter each time an input pulse is generated. In such an example, the controller 141 can determine whether volume counter corresponds to a first reference volume, and if the volume counter corresponds to the first reference volume, the output pulse generator can generate a single output pulse until the volume counter corresponds to a second reference volume. In such examples, when the volume counter exceeds the second reference volume, output pulse may not be generated. Thus, the pulse duration, and in turn, duty cycle of output pulses may be adjusted by the controller 141, so as to produce output pulses that are normalized (e.g., an integer value of volume per output pulse).

As mentioned above, deviations from the nominal operating range 500 may occur when the volumetric flow rate is low, so as to not result in any input pulses. In such cases, the pulse frequency $F_s$ of input pulse (number of pulses per second) can be low, and in some examples, may be nearly zero. As is apparent, when pulse frequency $F_s$ approaches zero, the time interval between input pulses $T_s$ which is the inverse of the pulse frequency $F_s$ may start approaching a large value. By determining time interval between input pulses $T_s$ or the pulse frequency $F_s$, the controller 141 may determine whether the flow meter is operating outside the nominal operating range 500.

Figure 7:
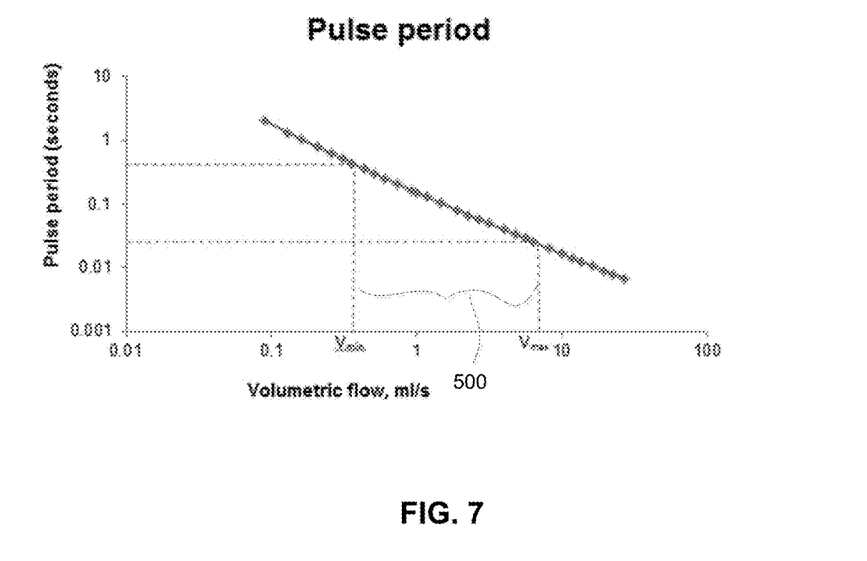
FIG. 7 is a non-limiting exemplary graph illustrating the relationship between time between input pulses and volumetric flow rate.
Figure 8:
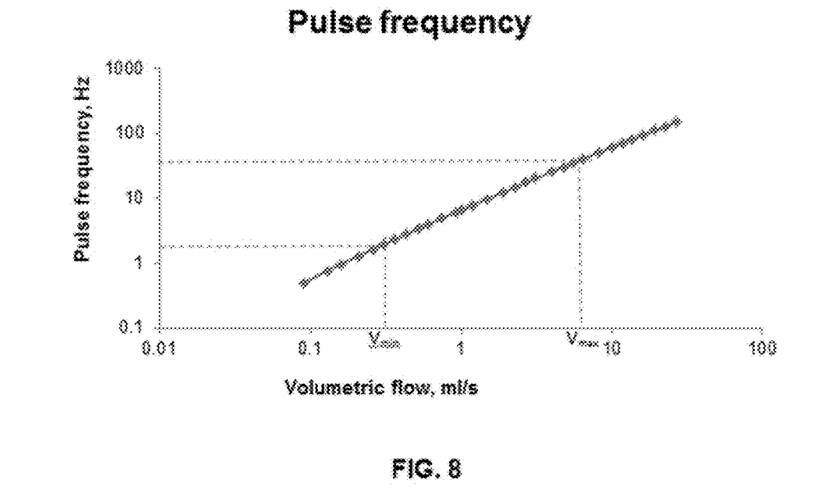
FIG. 8 is a non-limiting exemplary graph illustrating the relationship between input pulse frequency and volumetric flow rate.

In an example, the controller 141 can generate a correction function based on input pulse frequency $F_s$ and/or time interval between input pulses $T_s$. FIG. 7 illustrates an exemplary relationship between time interval between input pulses $T_s$ and volumetric flow rate V and FIG. 8 illustrates an exemplary relationship between frequency $F_s$ and volumetric flow rate V. FIGS. 7-8 may be determined from the generic calibration curve C1 shown in FIG. 5. In an example, the correction function can be generated based on the relationhip between time between pulses $T_s$ and volumetric flow rate (shown in FIG. 7), and pulse rate P and volumetric flow rate (shown in FIG. 5). By correlating the data between FIGS. 5 and 7, FIG. 9, which illustrates the relationship between time interval between pulses and pulse rate can be generated. In this example, the correction function $f$ corresponds to the graph illustrated in FIG. 9, and can be used to retrieve a correct pulse rate based on time interval between pulses, which can then be used to retrieve the correct volumetric flow rate (from FIG. 5). Thus, flow related quantities derived from the generic calibration may be correlated to each other and used for determining the correction function, as described below. It should be noted that FIGS. 5-9 are non-limiting illustrative examples and the numerical values and the mathematical relationship shown by these figures should not be construed as limiting the scope of the claims of the present application.

Figure 9:
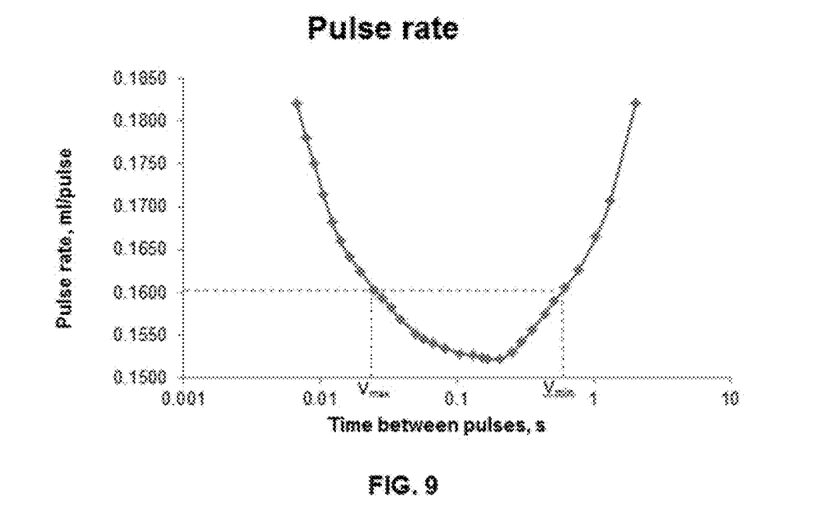
FIG. 9 is a non-limiting exemplary graph illustrating the relationship between volume per pulse and time between input pulses.

For example, referring to FIG. 9, the time interval between input pulses can be $T_s$, and the volume per input pulse can be "P". The volume per input pulse may be known from generic calibration, and in the nominal operating range 500, may be a generally have a low value of deviation (e.g., vary by ±3% in the nominal operating range). In some such cases, the volume per input pulse may be related to time between pulses $T_s$, as follows:

$$P = f(T_s)$$

In the above expression, "$f$" may refer to a mathematical function. When multiple input pulses are generated, total volume (e.g., over "N" pulses) may be represented as follows:

$$V = \sum_{n=1}^{N} P$$

Based on the relationship between flow per input pulse "P", and the time interval between input pulses $T_s$, the volume corresponding to several input pulses may be represented as follows:

$$V = \sum_{n=1}^{N} f(T_s)$$

Thus, the controller 141 may be able to determine volume based on time interval between input pulses. The controller 141 can use, in this example, the illustrated relationship between flow per input pulses P and volumetric flow rate V to determine the correction function "$f$," as described further below.

In certain examples, the controller 141 can determine the function "$f$" that correlates time interval between input pulses $T_s$ and volumetric flow rate V based on the generic calibration shown in FIG. 5. In such cases, the controller 141 can retrieve the generic calibration of the flow meter (e.g., from memory or data storage medium). The controller 141 can determine the function "$f$" from the generic calibration curve (e.g., seen in FIG. 5) as follows:

$$f(T_s) = \text{Pulse rate } (P)/\text{Volumetric flow rate } (V)$$

The correction function "$f$", thus correlates the pulse rate P to time between pulses $T_s$. The correlation between pulse rate P and time interval between pulses Ts can be stored (e.g., in memory or data storage medium) in the form of a look-up table. Thus, for example, if the controller 141 determines that the time between input pulses $T_s$ is lower or higher than time between input pulses in the nominal range, the controller 141 can retrieve the calculated correction function "$f$" (e.g., from the look-up table) and determine the pulse rate corresponding to the time between input pulses $T_s$. The resulting value of pulse rate can then be used to retrieve the volumetric flow rate "V" from the form of look-up table. In use, when the controller 141 receives a detection signal from the flow sensor 140 to generate actual input pulses, the controller 141 can determine whether the flow meter is operating outside the nominal operating range 500 by comparing an actual time interval between input pulses, $T_s$ to time interval between input pulses in the nominal operating range. If the controller 141 determines that the flow meter is operating outside its nominal operating range 500, the controller 141 may retrieve the correct pulse rate based on the function "$f$". The corrected input pulses can be then be used to generate an output pulse, as will be described below. The exemplary relationship between the time interval between input pulses $T_s$ and volumetric flow rate provided in FIG. 8 should not be construed as limiting. Different mathematical models may be used to determine the correction function.

Figure 10:
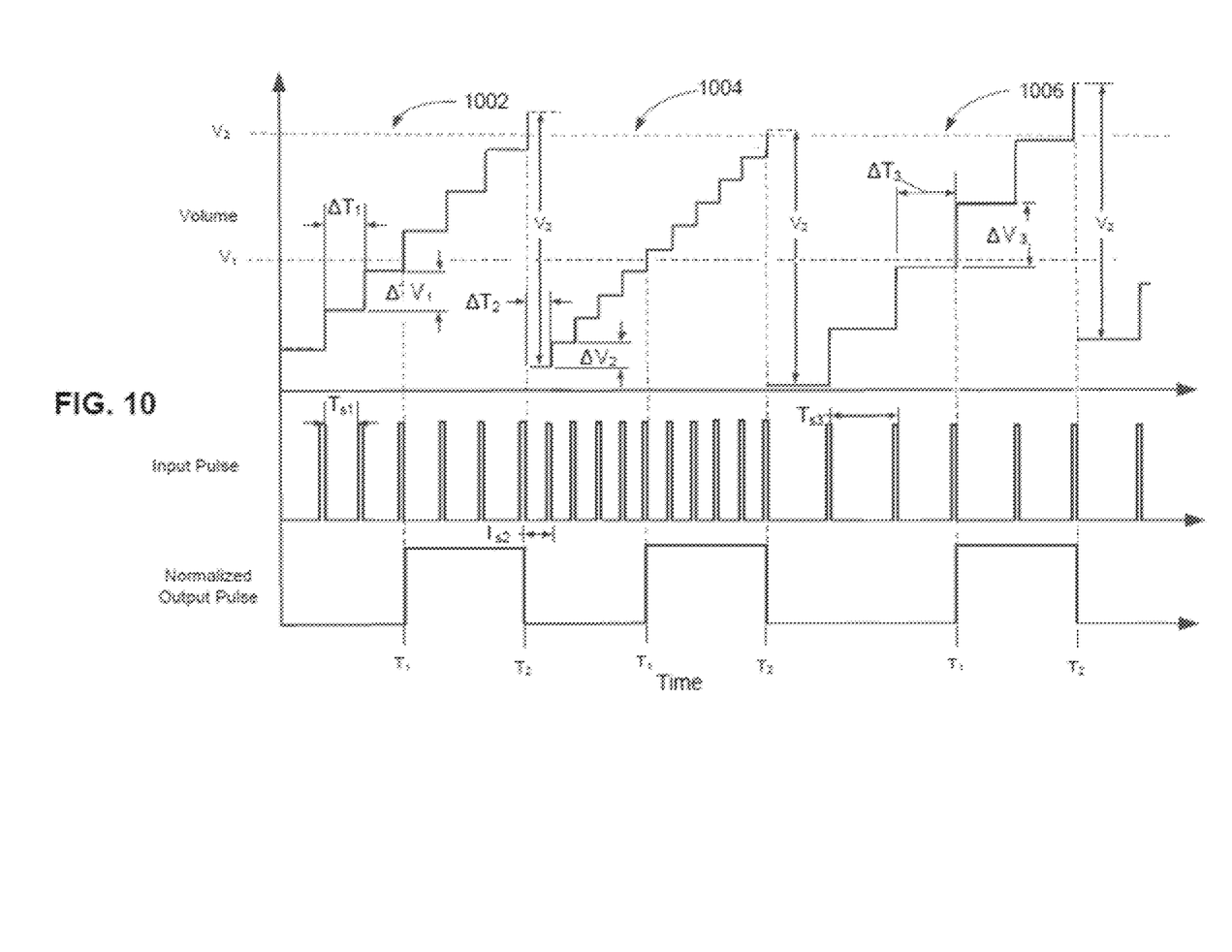
FIG. 10 is a non-limiting exemplary graph illustrating a function to correct input pulses.

FIG. 10 is an illustrative example of a step function used by the controller 141 to generate an output pulses. A non-limiting example of an output pulse generated by the controller 141 is shown in FIG. 10. In FIG. 10, the exemplary step function corresponding to the nominal operation is shown by the set of steps 1002. The step function corresponding to slower gear rotation (e.g., than in the nominal range) is shown by the set of steps 1004, while the step function corresponding to faster gear rotation (e.g., than in the nominal range) is shown by the set of steps 1006.

A step function such as that illustrated in FIG. 10 can include steps corresponding to input pulses. For instance, in the nominal operating range 500, shown by the set of steps 1002, if a full gear rotation corresponds to six input pulses, the step function may have six steps. The step function adjusts the pulse characteristics of the output pulse (e.g., pulse frequency, duty cycle, etc.) based on reference volumes as will be described further below. Optionally, the output pulse generated according to the non-limiting example of FIG. 10 can be "normalized" such that the volume per output pulse is an integer value as described in U.S. patent application Ser. No. 15/658,437, filed Jul. 25, 2017, titled "Fluid Flow Meter with Normalized Output."

Referring to FIG. 10, each "step" of the step function represents an incremental volume of fluid flowing through the fluid flow meter 100, and each step extends over a time interval ($\Delta T_1$, $\Delta T_2$, $\Delta T_3$, etc.). In situations where no correction is desired or where there are no non-linearities, such as in the nominal operating range 500, time interval $\Delta T_1$ may be generally equal to the time interval between input pulses, $T_{s1}$. At flow conditions where the gears rotate much slower than in the nominal flow range, the time interval of steps $\Delta T_2$ may be adjusted be less than time interval of steps $\Delta T_1$ in the nominal flow range. At flow conditions where the gears rotate much faster than in the nominal flow range, the time interval of steps $\Delta T_3$ may be adjusted be greater than time interval of steps $\Delta T_1$ in the nominal flow range.

Once the incremental volume reaches first reference volume $V_1$ (e.g., at time $T_1$), the controller 141 begins generation of an output pulse. The controller 141 can increment a volume counter by an amount corresponding to volume per input pulse (e.g., pulse rate "P"), each time an input pulse is generated. During this time, fluid continues to flow through the flow meter, and the controller 141 continues to increment the volume counter by an amount corresponding to volume per pulse. When the volume reaches a second reference volume $V_2$ (e.g., at time $T_2$), the output pulse is stopped, and the volume counter is cleared.

Further, the controller 141 may adjust the step function such that if time interval between input pulses $T_{s3}$ is lower (e.g., compared to a predetermined time interval in the nominal operating range 500), the controller 141 delays incrementing the volume counter. The delay can be an amount corresponding to a deviation between predetermined time interval $T_T$ (e.g., obtainable from generic calibration), and the time interval between input pulses $T_{s3}$ during use. Alternatively, the delay can correspond to the correction function "$f$" stored in the form of a look-up table, and simply applied (e.g., added to time interval between input pulses $T_s$) as described above. Thus, the "steps" of the step function span over a larger time interval $\Delta T_3$ when the time interval between input pulses $T_{s3}$ is less than the predetermined time interval $T_T$ (e.g., faster gear rotation). Once the volume counter reaches a first reference volume $V_1$, the controller 141 may start generating an output pulse.

Similarly, the controller 141 can adjust the step function duration in situations where the time interval between input pulses $T_{s2}$ is larger (e.g., slower gear rotation at low flow rates), so as to provide steps that extend over a shorter duration $\Delta T_2$. Accordingly, the controller 141 may produce more steps per output pulse, as seen from the set of steps 1004, to account for fewer pulses. The duration of steps can likewise be determined based on the deviation of time interval between input pulses $T_s$ from predetermined time interval $T_T$ (e.g., determinable from the generic calibration).

Appreciably, the steps last over a shorter duration than in the nominal flow range (e.g., $\Delta T_2 < \Delta T_1$). Advantageously, such embodiments result in output pulses that are uniform over a wide range of gear rotations. As seen from FIG. 10, the output pulses corresponding to the three sets of step functions have similar characteristics.

While exemplary correction functions to correct for non-linearities are illustrated, such examples should not be construed as limiting. Further, while examples described above illustrate applying the correction function when the flow meter is operating outside the nominal operating range 500, the input pulses can also be corrected when the flow meter is operating within the nominal operating range 500.

Advantageously, fluid flow meters according to the disclosed embodiments can permit the output of the oval gear meter to be corrected to account for generic non-linearities the magnitude of which may be higher than the measurement uncertainties due to variability in manufacturing (e.g., tolerances) of individual meters. A further advantage of embodiments of the present disclosure is the ability to operate the oval gear meter in the range outside of the nominal range.

Various examples have been described. These and other examples are within the scope of the following claims.

The invention claimed is:

1. A fluid flow meter, comprising;
   a flow chamber;
   a first gear intermeshing with a second gear, the first gear and the second gear being positioned within the flow chamber, the intermeshing of the first gear and the second gear permitting synchronous rotation of the first gear and the second gear in response to flow of a fluid through the flow chamber
   the fluid flow meter having a nominal operating range of volumes comprising a maximum volumetric flow rate and a minimum volumetric flow rate; and
   a flow sensor configured to generate a detection signal in response to the passage of fluid through the flow chamber and/or synchronous rotation of the first gear and the second gear; and
   a controller operatively coupled to a data storage medium, the controller being configured to:
      receive detection signal from the flow sensor to generate input pulses, a volume per input pulse being generally constant in the nominal operating range,
      determine an input pulse frequency, whereby, the input pulse frequency corresponds to a number of pulses per second,
      determine whether the fluid flow meter is operating outside the nominal operating range based on the input pulse frequency,
      generate a correction function based on the input pulse frequency, and
      apply the correction function to input pulses when the controller determines that the fluid flow meter is operated outside the nominal operating range.

2. The fluid flow meter of claim 1, wherein the controller is configured to store the determined correction function in the data storage medium.

3. The fluid flow meter of claim 2, wherein the controller is configured to store the correction function in the data storage medium in the form of a look-up table.

4. The fluid flow meter of claim 3, wherein the controller is configured to correlate the correction function to a given pulse frequency of input pulses, and wherein the data storage medium stores the correction function corresponding to the given rate of input pulses.

5. The fluid flow meter of claim 1, wherein the controller is configured to generate output pulses corresponding to input pulses, whereby each output pulse is generated by
retrieving the correction function corresponding to the input pulse, and
applying the correction function to a corresponding input pulse.

6. The fluid flow meter of claim 5, wherein the controller is configured to generate a single output pulse corresponding to a plurality of input pulses.

7. The fluid flow meter of claim 5, wherein the controller is configured to delay generation of output pulses when the flow meter is operating outside the nominal operating range.

8. The fluid flow meter of claim 7, wherein the controller is configured to delay generation of output pulses by an amount corresponding to the correction function.

9. A fluid flow meter, comprising;
a flow chamber;
a first gear intermeshing with a second gear, the first gear and the second gear being positioned within the flow chamber, the intermeshing of the first gear and the second gear permitting synchronous rotation of the first gear and the second gear in response to flow of a fluid through the flow chamber
the fluid flow meter having a nominal operating range of volumes comprising a maximum volumetric flow rate and a minimum volumetric flow rate; and
a flow sensor configured to generate a detection signal in response to the passage of fluid through the flow chamber and/or synchronous rotation of the first gear and the second gear; and
a controller operatively coupled to a data storage medium configured to store generic calibration of the fluid flow meter, wherein the generic calibration represents a predetermined relationship between a volumetric flow rate of fluid correlated to volume per input pulse
the controller being configured to:
retrieve the generic calibration of the fluid flow meter,
determine a correction function based on the generic calibration, the correction function being a function of time interval between input pulses,
receive detection signal from the flow sensor to generate input pulses, and
apply the correction function to the time interval between input pulses, and
generate an output pulse.

10. The fluid flow meter of claim 9, wherein the fluid flow meter is configured to determine the predetermined time interval between input pulses based on a slope of the generic calibration.

11. The fluid flow meter of claim 9, wherein the fluid flow meter is operable in a nominal operating range, wherein a volume of fluid flowing through the fluid flow meter per actual input pulse is a generally constant value in the nominal operating range.

12. The fluid flow meter of claim 11, wherein the pulse frequency represents an inverse of the actual time interval between input pulses, the input pulse frequency increases monotonically with respect to the volumetric flow rate in the nominal operating range.

13. The fluid flow meter of claim 11, wherein the controller is configured to correct the input pulses when the fluid flow meter operates outside the nominal operating range.

14. A fluid flow meter, comprising;
a flow chamber;
a first gear intermeshing with a second gear, the first gear and the second gear being positioned within the flow chamber, the intermeshing of the first gear and the second gear permitting synchronous rotation of the first gear and the second gear in response to flow of a fluid through the flow chamber; and
a flow sensor configured to generate a detection signal in response to the passage of fluid through the flow chamber and/or synchronous rotation of the first gear and the second gear
a controller having an output pulse generator and being configured to
receive detection signal from the flow sensor and generate input pulses in response to the detection signal,
determine, based on an actual time interval between input pulses whether the fluid flow meter is operating outside a nominal operating range,
generate a correction function based on a predetermined time interval between input pulses and the actual time interval between input pulses,
increment a volume counter by an amount equal to a volume per input pulse at a time corresponding to time interval of input pulse corrected by the correction function,
transition the output pulse generator from a state where the output pulse generator does not generate output pulses to a state where the output pulse generator starts generating an output pulse when the volume counter exceeds a first reference volume, and
transition the output pulse generator from a state where the output pulse generator generates the output pulse back to a state where the output pulse generator stops generating the output pulse.

15. The fluid flow meter of claim 14, wherein the output pulse generator is configured to generate the output pulse such that the volume per output pulse is an integer.

16. The fluid flow meter of claim 14, wherein the controller is configured to generate a single output pulse for every "N" input pulses generated, whereby N is an integer greater than one.

17. The fluid flow meter of claim 14, wherein the controller is configured to determine whether volume counter corresponds to a first reference volume, and if the volume counter corresponds to the first reference volume, the output pulse generator is further configured to generate a single output pulse until the volume counter corresponds to a second reference volume.

18. The fluid flow meter of claim 17, wherein, when the volume counter exceeds the second reference volume the controller is further configured to reset the volume counter to zero.

19. The fluid flow meter of claim 14, wherein a pulse frequency of the output pulse is less than a pulse frequency of input pulses.

20. The fluid flow meter of claim 14, wherein the output pulses corresponding to the nominal operating range and output pulses generated when the flow meter operates outside the nominal operating range have generally equal pulse characteristics, the pulse characteristics including at least one of pulse duration, and duty cycle.

* * * * *

UNITED STATES PATENT AND TRADEMARK OFFICE
CERTIFICATE OF CORRECTION

PATENT NO. : 10,126,152 B1
APPLICATION NO. : 15/658435
DATED : November 13, 2018
INVENTOR(S) : Eugene Tokhtuev Page 1 of 1

It is certified that error appears in the above-identified patent and that said Letters Patent is hereby corrected as shown below:

On the Title Page

Column 2, Item (74), delete "Fredrickson" and insert --Fredrikson--

Signed and Sealed this
Nineteenth Day of February, 2019

Andrei Iancu
*Director of the United States Patent and Trademark Office*